United States Patent
Vegas et al.

(10) Patent No.: US 12,413,491 B2
(45) Date of Patent: Sep. 9, 2025

(54) THREAT DETECTION OF APPLICATION TRAFFIC FLOWS

(71) Applicant: Cisco Technology, Inc., San Jose, CA (US)

(72) Inventors: Thomas Vegas, Gland (CH); Anirban Karmakar, Vaud (CH); Salvatore Valenza, Pomy (CH); Hamsa Sankaran, Zurich (CH)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/748,188

(22) Filed: Jan. 21, 2020

(65) Prior Publication Data

US 2021/0226866 A1    Jul. 22, 2021

(51) Int. Cl.
| | |
|---|---|
| H04L 43/062 | (2022.01) |
| H04L 41/0894 | (2022.01) |
| H04L 41/14 | (2022.01) |
| H04L 41/22 | (2022.01) |
| H04L 41/40 | (2022.01) |
| H04L 43/026 | (2022.01) |
| H04L 43/0817 | (2022.01) |
| H04L 43/0823 | (2022.01) |
| H04L 43/20 | (2022.05) |
| H04L 61/4511 | (2022.01) |

(52) U.S. Cl.
CPC .......... H04L 43/026 (2013.01); H04L 41/14 (2013.01); H04L 41/22 (2013.01); H04L 41/40 (2022.05); H04L 43/062 (2013.01); H04L 43/0817 (2013.01); H04L 43/0823 (2013.01); H04L 43/20 (2022.05); H04L 61/4511 (2022.05); H04L 41/0894 (2022.05)

(58) Field of Classification Search
CPC . H04L 43/062; H04L 43/0817; H04L 3/0823; H04L 41/22; H04L 61/1511
See application file for complete search history.

(56) References Cited

U.S. PATENT DOCUMENTS

| | | | |
|---|---|---|---|
| 8,832,260 B2 | 9/2014 | Raja et al. | |
| 9,479,447 B2 | 10/2016 | Samuels et al. | |
| 9,813,320 B2* | 11/2017 | Edwards | H04L 43/0829 |
| 10,374,904 B2* | 8/2019 | Dubey | H04L 43/045 |
| 10,581,914 B2* | 3/2020 | Krauss | H04L 63/1416 |
| 10,771,489 B1* | 9/2020 | Bisht | G06N 20/00 |
| 10,999,149 B2* | 5/2021 | Rao | H04L 41/0895 |
| 11,411,942 B1* | 8/2022 | Dhammawat | H04W 12/041 |
| 2006/0126613 A1* | 6/2006 | Zweig | H04L 45/22 370/465 |
| 2010/0082805 A1* | 4/2010 | Orton | H04L 43/0805 709/224 |

(Continued)

*Primary Examiner* — Ricky Chin
(74) *Attorney, Agent, or Firm* — Polsinelli P.C.

(57) ABSTRACT

The present technology pertains to identifying one or more sub-components of one or more network devices in a network environment; disaggregating the one or more sub-components from corresponding network devices of the one or more network devices; monitoring one or more functional flows across the one or more sub-components on a sub-component basis to generate functional flow data associated with the one or more sub-components; and generating analytics of the network environment on a sub-component basis from the functional flow data.

20 Claims, 10 Drawing Sheets

(56) References Cited

U.S. PATENT DOCUMENTS

| | | | |
|---|---|---|---|
| 2014/0071831 A1* | 3/2014 | Sinha | H04L 43/0882 370/241.1 |
| 2014/0137246 A1* | 5/2014 | Baluda | H04W 12/08 726/22 |
| 2014/0266669 A1* | 9/2014 | Fadell | H05B 47/115 340/501 |
| 2015/0236895 A1* | 8/2015 | Kay | H04L 43/045 709/224 |
| 2015/0319629 A1* | 11/2015 | Dabirmoghaddam | H04W 28/04 370/252 |
| 2015/0326469 A1* | 11/2015 | Kern | H04L 41/0866 370/254 |
| 2016/0105814 A1* | 4/2016 | Hurst | H04L 67/025 370/252 |
| 2016/0134363 A1* | 5/2016 | Buckland | H04B 10/038 398/5 |
| 2016/0269225 A1* | 9/2016 | Kirchmeier | H04L 12/40 |
| 2016/0295398 A1* | 10/2016 | Ketheesan | H04W 8/02 |
| 2016/0350173 A1* | 12/2016 | Ahad | H04L 67/02 |
| 2017/0054603 A1* | 2/2017 | Kulkarni | H04L 41/0893 |
| 2017/0111813 A1* | 4/2017 | Townend | H04W 24/04 |
| 2017/0270321 A1* | 9/2017 | Hosey | G06F 21/75 |
| 2018/0084000 A1* | 3/2018 | Baukes | H04L 63/1433 |
| 2018/0139131 A1* | 5/2018 | Ignatchenko | H04L 47/32 |
| 2018/0191678 A1* | 7/2018 | Polcha, Sr. | H04L 63/0227 |
| 2019/0014150 A1* | 1/2019 | Isola | H04W 12/08 |
| 2019/0042110 A1* | 2/2019 | Bharadwaj | G06N 20/00 |
| 2019/0215228 A1* | 7/2019 | Ramachandran | H04L 67/04 |
| 2019/0229995 A1* | 7/2019 | Rao | H04L 41/0853 |
| 2019/0342217 A1* | 11/2019 | Mazurek | H04L 49/30 |
| 2019/0379683 A1* | 12/2019 | Overby | G06F 9/45533 |
| 2020/0112497 A1* | 4/2020 | Yenumulapalli | H04L 43/10 |
| 2020/0252413 A1* | 8/2020 | Buzbee | G06F 21/629 |
| 2020/0280568 A1* | 9/2020 | Bratspiess | H04L 63/1433 |
| 2020/0287833 A1* | 9/2020 | Bottorff | H04L 47/11 |
| 2020/0295988 A1* | 9/2020 | Bolding | H04L 41/0803 |
| 2020/0336398 A1* | 10/2020 | Thomas | H04L 41/12 |
| 2020/0351201 A1* | 11/2020 | Li | G06F 11/3006 |
| 2020/0389469 A1* | 12/2020 | Litichever | H04L 63/145 |
| 2020/0412824 A1* | 12/2020 | Liguori | H04L 67/53 |
| 2021/0058300 A1* | 2/2021 | Kärkkäinen | H04L 41/12 |
| 2021/0058315 A1* | 2/2021 | Sanzgiri | G06N 20/00 |
| 2021/0075689 A1* | 3/2021 | Ramanathan | G06N 3/08 |
| 2021/0218659 A1* | 7/2021 | Fujiki | H04L 43/065 |
| 2021/0226866 A1* | 7/2021 | Vegas | H04L 43/0823 |
| 2022/0338052 A1* | 10/2022 | Lee | H04W 80/10 |
| 2022/0345914 A1* | 10/2022 | Kim | H04L 43/12 |
| 2023/0125134 A1* | 4/2023 | Raleigh | H04L 41/046 455/410 |
| 2023/0171191 A1* | 6/2023 | Ignatchenko | H04L 69/16 370/392 |

* cited by examiner

THREAT DETECTION OF APPLICATION TRAFFIC FLOWS

TECHNICAL FIELD

The present technology pertains to systems, methods, and computer-readable media for monitoring functional flows in a networking environment, and in particular to disaggregating and monitoring functional flows across sub-components of network devices as distinct entities.

BACKGROUND

Networking environments can be monitored to ensure that they are performing in a correct manner, e.g. to provide network assurance. Typically, network devices can be monitored on a per-network device basis. In turn, bottlenecks in the networking environment may be isolated to a specific network device. Individual network devices can be multifaceted, encompassing multiple pieces of hardware and software. Accordingly, problems often occur on a subnetwork device level, making it difficult to accurately detect both the occurrence and sources of the problems in a network environment, e.g. without extensive testing. In turn, this makes it difficult to mitigate the problems in the network environment.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1A:
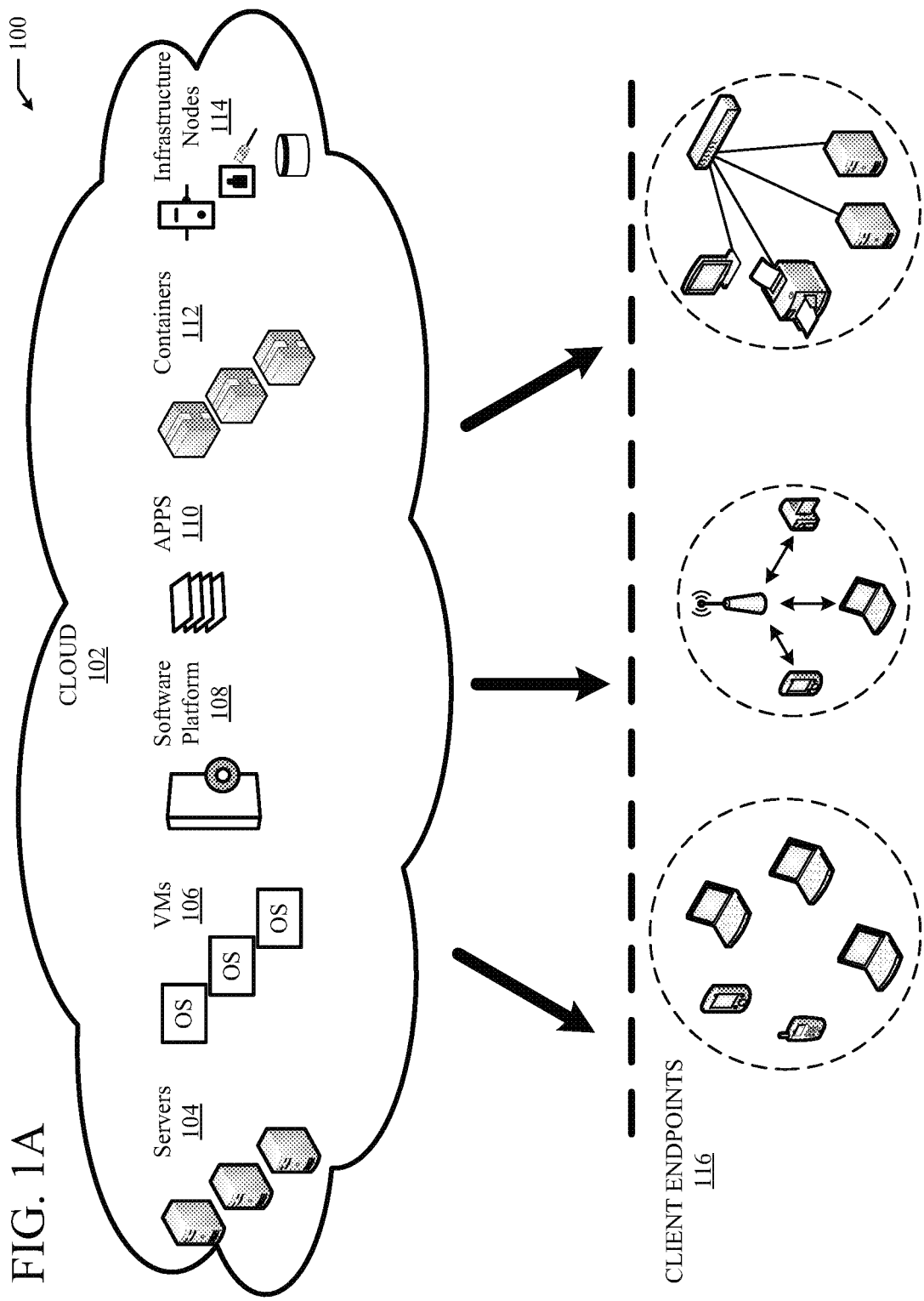
FIG. 1A illustrates a diagram of an example cloud computing architecture.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

OVERVIEW

A method can include identifying one or more sub-components of one or more network devices in a network environment. The one or more sub-components can be disaggregated from corresponding network devices of the one or more network devices including the sub-components. Further, one or more functional flows can be monitored across the one or more sub-components on a sub-component basis to generate functional flow data associated with the one or more sub-components. As follows, analytics of the network environment can be generated on a sub-component basis from the functional flow data.

A system can include one or more processors and at least one computer-readable storage medium storing instructions which, when executed by the one or more processors, cause the one or more processors to identify one or more sub-components of one or more network devices in a network environment. The one or more sub-components can include either or both hardware components and software components of the one or more network devices. The instructions can also cause the one or more processors to disaggregate the one or more sub-components from corresponding network devices of the one or more network devices. Further, the instructions can cause the one or more processors to monitor one or more functional flows across the one or more sub-components on a sub-component basis to generate functional flow data associated with the one or more sub-components. Additionally, the instructions can cause the one or more processors to generate analytics of the network environment on a sub-component basis from the functional flow data.

A non-transitory computer-readable storage medium having stored therein instructions which, when executed by a processor, cause the processor to identify one or more sub-components of one or more network devices in a network environment. The instructions can also cause the processor to disaggregate the one or more sub-components from corresponding network devices of the one or more network devices. Further, the instructions can cause the processor to monitor one or more functional flows across the one or more sub-components on a sub-component basis to generate functional flow data associated with the one or more sub-components. Additionally, the instructions can cause the processor to generate analytics of the network environment on a sub-component basis from the functional flow data. The instructions can also cause the processor to generate a graphical user interface displaying at least a portion of the analytics of the network environment on the sub-component basis.

EXAMPLE EMBODIMENTS

The disclosed technology addresses the need in the art for monitoring a network environment on a sub-component basis with respect to network devices in the network environment. Further, the disclosed technology addresses the needs in the art for generating and presenting analytics for a network environment on a sub-component basis with respect to network devices in the network environment. The present technology involves systems, methods, and computer-readable media for monitoring a network environment on a sub-component basis and generating and presenting analytics for the environment on the sub-component basis with respect to network devices in the network environment.

The present technology takes monitoring and analytics systems normally used for networking devices and extends them to be used on sub-components of networking devices. By monitoring functional flows not only between networking devices, but between 1) sub-components within a networking device (internal communications) and 2) sub-components across networking devices (external communications), the present technology creates a view of functional flows that unifies sub-component communications with device communications.

Figure 5:
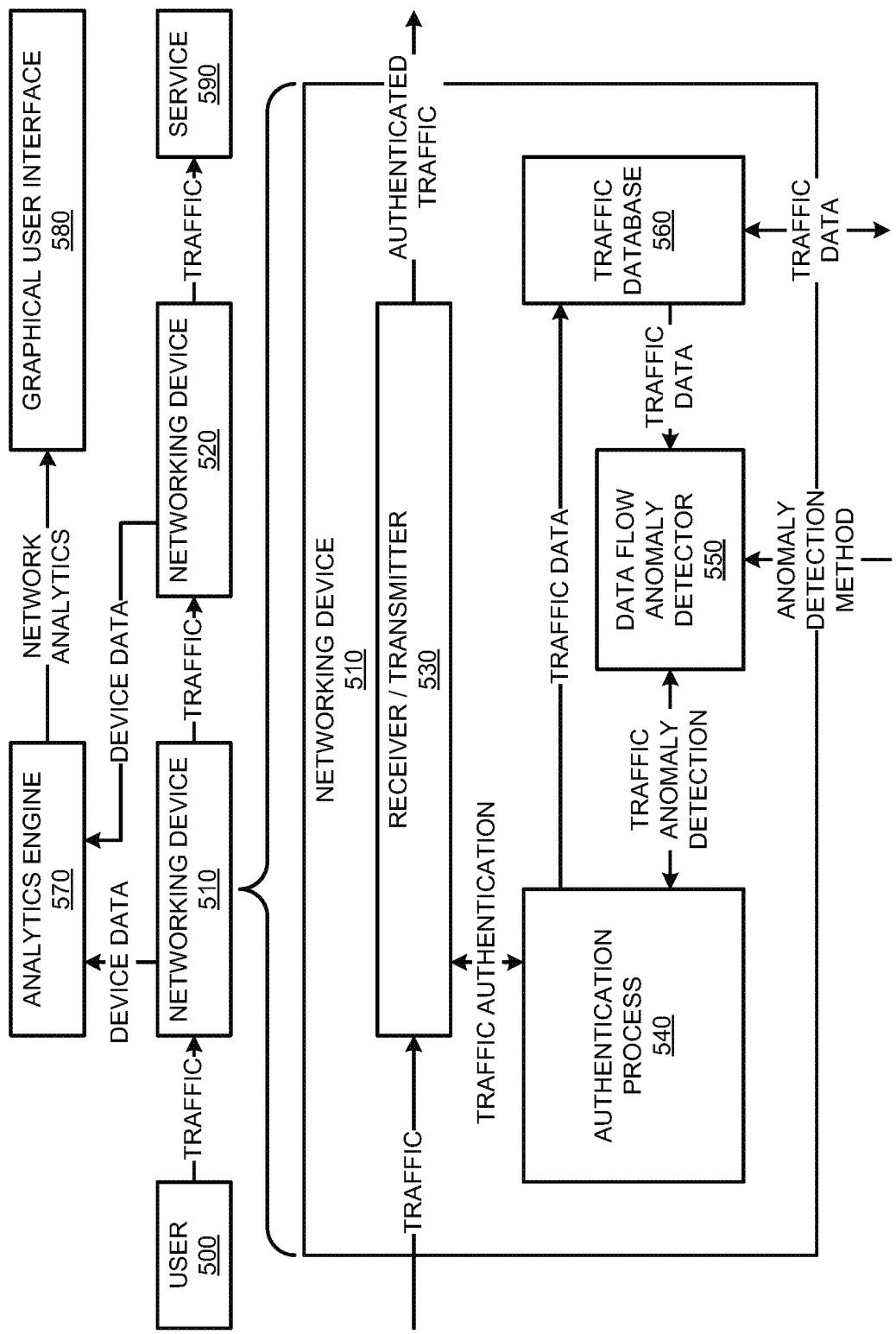
FIG. 5 illustrates an example network environment for monitoring network devices on a sub-component basis.
Figure 6:
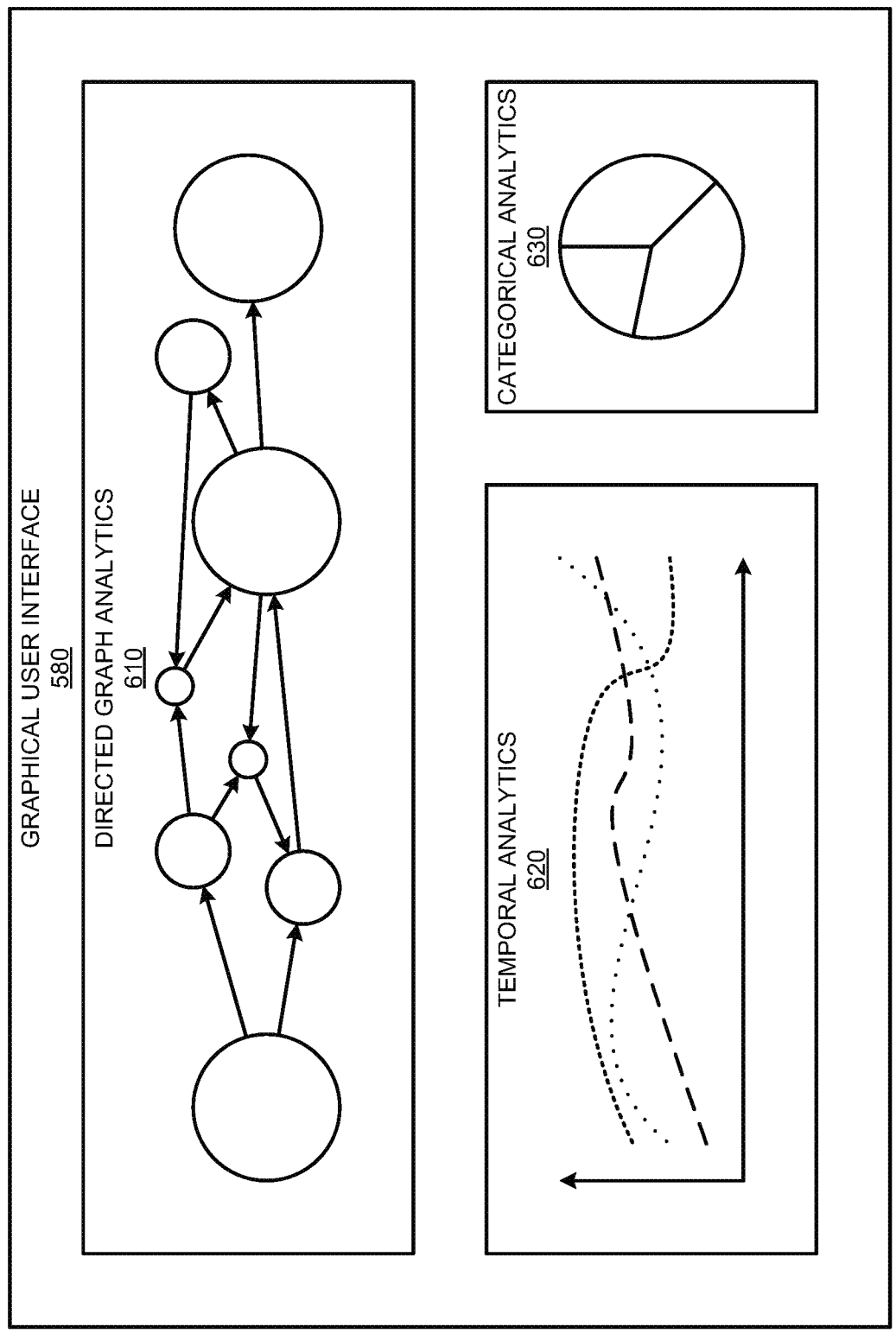
FIG. 6 illustrates an example graphical user interface of analytics in a network environment that are generated on a sub-component basis in accordance with some aspects of the present technology.
Figure 7:
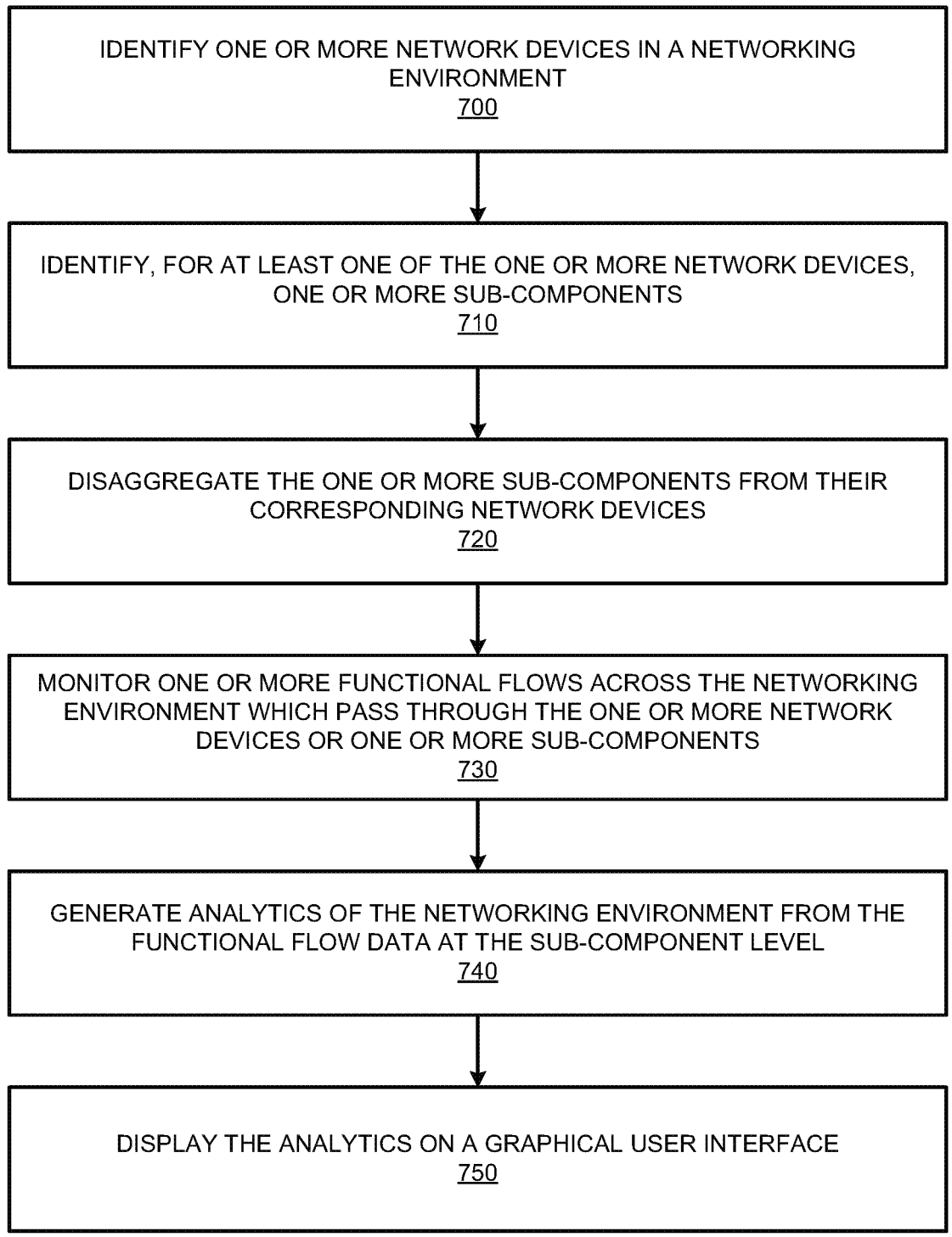
FIG. 7 illustrates an example method embodiment in accordance with some aspects of the present technology.
Figure 8:
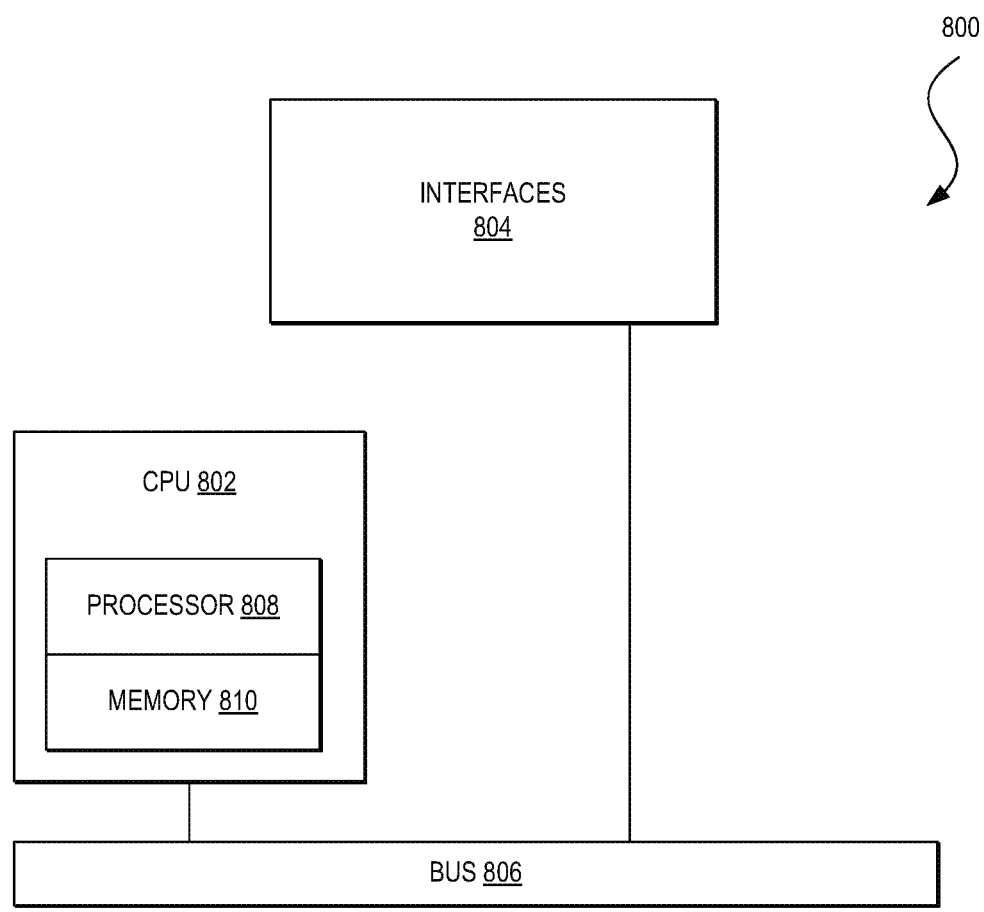
FIG. 8 illustrates an example network device.
Figure 9:
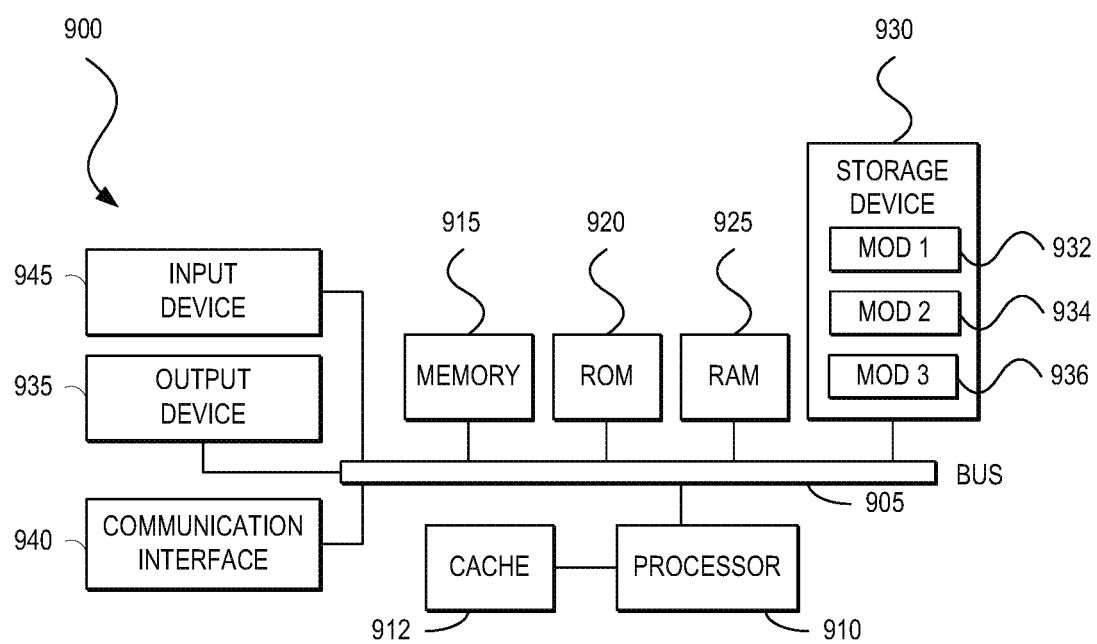
FIG. 9 illustrates an example computing system.

A description of network environments and architectures for network data access and services, as illustrated in FIGS. 1-4 is first disclosed herein. A discussion of systems, methods, and computer-readable media for monitoring a network environment and generating and presenting analytics of the network environment on a sub-component basis with respect to network devices in the network environment, as shown in FIGS. 5 through 7, will then follow. The discussion then concludes with a brief description of example devices, as illustrated in FIGS. 8 and 9. These variations shall be described herein as the various embodiments are set forth. The disclosure now turns to FIG. 1A.

FIG. 1A illustrates a diagram of an example cloud computing architecture 100. The architecture can include a cloud 102. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can provide various cloud computing services via the cloud elements 104-114, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

Figure 1B:
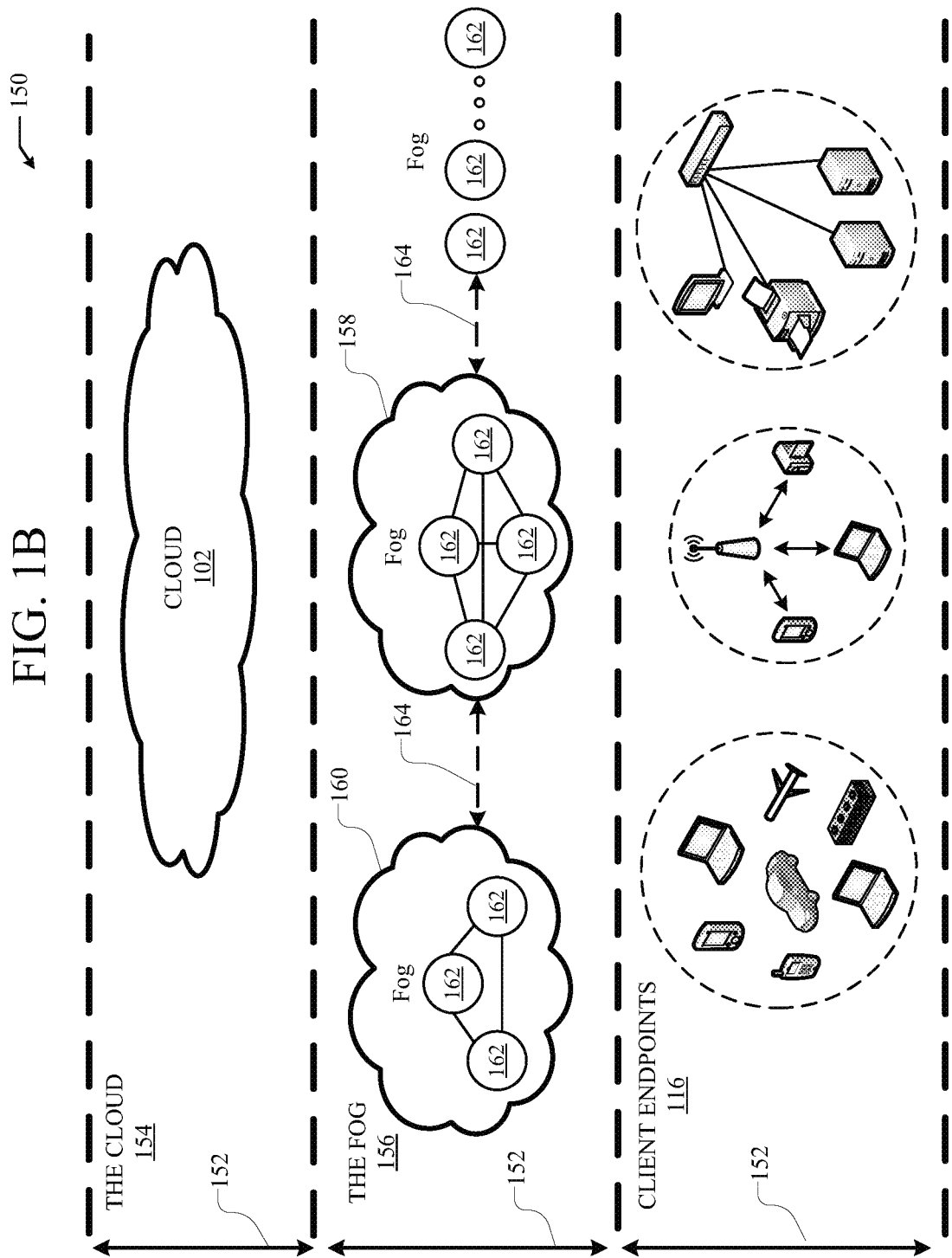
FIG. 1B illustrates a diagram of an example fog computing architecture.

FIG. 1B illustrates a diagram of an example fog computing architecture 150. The fog computing architecture 150 can include the cloud layer 154, which includes the cloud 102 and any other cloud system or environment, and the fog layer 156, which includes fog nodes 162. The client endpoints 116 can communicate with the cloud layer 154 and/or the fog layer 156. The architecture 150 can include one or more communication links 152 between the cloud layer 154, the fog layer 156, and the client endpoints 116. Communications can flow up to the cloud layer 154 and/or down to the client endpoints 116.

The fog layer 156 or "the fog" provides the computation, storage and networking capabilities of traditional cloud networks, but closer to the endpoints. The fog can thus extend the cloud 102 to be closer to the client endpoints 116. The fog nodes 162 can be the physical implementation of fog networks. Moreover, the fog nodes 162 can provide local or regional services and/or connectivity to the client endpoints 116. As a result, traffic and/or data can be offloaded from the cloud 102 to the fog layer 156 (e.g., via fog nodes 162). The fog layer 156 can thus provide faster services and/or connectivity to the client endpoints 116, with lower latency, as well as other advantages such as security benefits from keeping the data inside the local or regional network(s).

The fog nodes 162 can include any networked computing devices, such as servers, switches, routers, controllers, cameras, access points, gateways, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 162 can be deployed within fog instances 158, 160. The fog instances 158, 160 can be local or regional clouds or networks. For example, the fog instances 158, 160 can be a regional cloud or data center, a local area network, a network of fog nodes 162, etc. In some configurations, one or more fog nodes 162 can be deployed within a network, or as standalone or individual nodes, for example. Moreover, one or more of the fog nodes 162 can be interconnected with each other via links 164 in various topologies, including star, ring, mesh or hierarchical arrangements, for example.

In some cases, one or more fog nodes 162 can be mobile fog nodes. The mobile fog nodes can move to different geographical locations, logical locations or networks, and/or fog instances while maintaining connectivity with the cloud layer 154 and/or the endpoints 116. For example, a particular fog node can be placed in a vehicle, such as an aircraft or train, which can travel from one geographical location and/or logical location to a different geographical location and/or logical location. In this example, the particular fog node may connect to a particular physical and/or logical connection point with the cloud 154 while located at the starting location and switch to a different physical and/or logical connection point with the cloud 154 while located at the destination location. The particular fog node can thus move within particular clouds and/or fog instances and, therefore, serve endpoints from different locations at different times.

Figure 2:
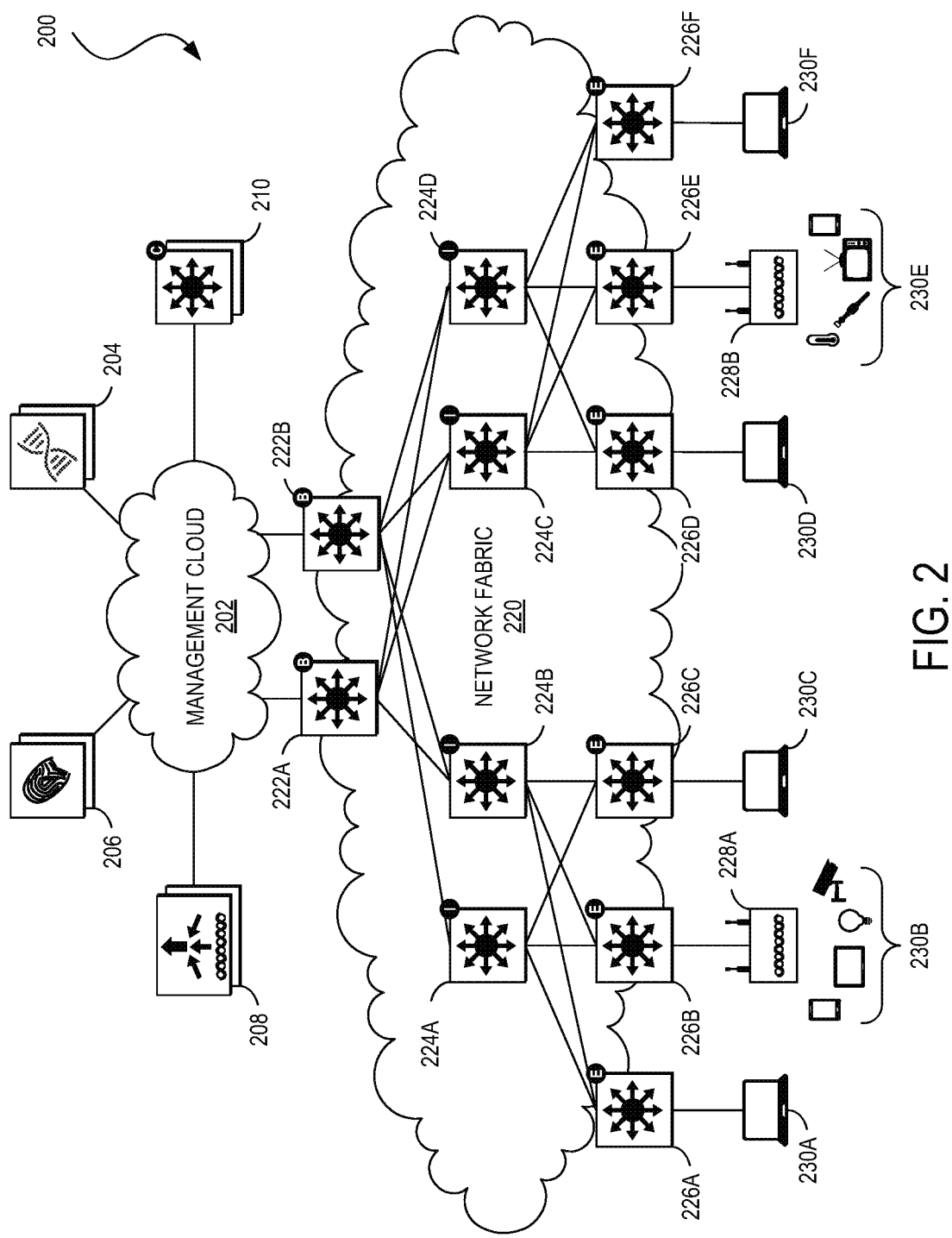
FIG. 2 illustrates an example of a physical topology of an enterprise network in accordance with an embodiment.

FIG. 2 illustrates an example of a physical topology of an enterprise network 200 for providing intent-based networking. It should be understood that, for the enterprise network 200 and any network discussed herein, there can be additional or fewer nodes, devices, links, networks, or components in similar or alternative configurations. Example embodiments with different numbers and/or types of endpoints, nodes, cloud components, servers, software components, devices, virtual or physical resources, configurations, topologies, services, appliances, or deployments are also contemplated herein. Further, the enterprise network 200 can include any number or type of resources, which can be accessed and utilized by endpoints or network devices. The illustrations and examples provided herein are for clarity andi simplicity.

In this example, the enterprise network 200 includes a management cloud 202 and a network fabric 220. Although shown as an external network or cloud to the network fabric 220 in this example, the management cloud 202 may alternatively or additionally reside on the premises of an organization or in a colocation center (in addition to being hosted by a cloud provider or similar environment). The management cloud 202 can provide a central management plane for building and operating the network fabric 220. The management cloud 202 can be responsible for forwarding configuration and policy distribution, as well as device management and analytics. The management cloud 202 can comprise one or more network controller appliances 204, one or more authentication, authorization, and accounting (AAA) appliances 206, one or more wireless local area network controllers (WLCs) 208, and one or more fabric control plane nodes 210. In other embodiments, one or more elements of the management cloud 202 may be co-located with the network fabric 220.

The network controller appliance(s) 204 can function as the command and control system for one or more network fabrics, and can house automated workflows for deploying and managing the network fabric(s). The network controller appliance(s) 204 can include automation, design, policy, provisioning, and assurance capabilities, among others, as discussed further below with respect to FIG. 3. In some embodiments, one or more Cisco Digital Network Architecture (Cisco DNA™) appliances can operate as the network controller appliance(s) 204.

The AAA appliance(s) 206 can control access to computing resources, facilitate enforcement of network policies, audit usage, and provide information necessary to bill for services. The AAA appliance can interact with the network controller appliance(s) 204 and with databases and directories containing information for users, devices, things, policies, billing, and similar information to provide authentication, authorization, and accounting services. In some embodiments, the AAA appliance(s) 206 can utilize Remote Authentication Dial-In User Service (RADIUS) or Diameter to communicate with devices and applications. In some embodiments, one or more Cisco® Identity Services Engine (ISE) appliances can operate as the AAA appliance(s) 206.

The WLC(s) 208 can support fabric-enabled access points attached to the network fabric 220, handling traditional tasks associated with a WLC as well as interactions with the fabric control plane for wireless endpoint registration and roaming. In some embodiments, the network fabric 220 can implement a wireless deployment that moves data-plane termination (e.g., VXLAN) from a centralized location (e.g., with previous overlay Control and Provisioning of Wireless Access Points (CAPWAP) deployments) to an access point/fabric edge node. This can enable distributed forwarding and distributed policy application for wireless traffic while retaining the benefits of centralized provisioning and administration. In some embodiments, one or more Cisco® Wireless Controllers, Cisco® Wireless LAN, and/or other Cisco DNA™-ready wireless controllers can operate as the WLC(s) 208.

The network fabric 220 can comprise fabric border nodes 222A and 222B (collectively, 222), fabric intermediate nodes 224A-D (collectively, 224), and fabric edge nodes 226A-F (collectively, 226). Although the fabric control plane node(s) 210 are shown to be external to the network fabric 220 in this example, in other embodiments, the fabric control plane node(s) 210 may be co-located with the network fabric 220. In embodiments where the fabric control plane node(s) 210 are co-located with the network fabric 220, the fabric control plane node(s) 210 may comprise a dedicated node or set of nodes or the functionality of the fabric control node(s) 210 may be implemented by the fabric border nodes 222.

The fabric control plane node(s) 210 can serve as a central database for tracking all users, devices, and things as they attach to the network fabric 220, and as they roam around. The fabric control plane node(s) 210 can allow network infrastructure (e.g., switches, routers, WLCs, etc.) to query the database to determine the locations of users, devices, and things attached to the fabric instead of using a flood and learn mechanism. In this manner, the fabric control plane node(s) 210 can operate as a single source of truth about where every endpoint attached to the network fabric 220 is located at any point in time. In addition to tracking specific endpoints (e.g.,/32 address for IPV4,/128 address for IPV6, etc.), the fabric control plane node(s) 210 can also track larger summarized routers (e.g., IP/mask). This flexibility can help in summarization across fabric sites and improve overall scalability.

The fabric border nodes 222 can connect the network fabric 220 to traditional Layer 3 networks (e.g., non-fabric networks) or to different fabric sites. The fabric border nodes 222 can also translate context (e.g., user, device, or thing mapping and identity) from one fabric site to another fabric site or to a traditional network. When the encapsulation is the same across different fabric sites, the translation of fabric context is generally mapped 1:1. The fabric border nodes 222 can also exchange reachability and policy information with fabric control plane nodes of different fabric sites. The fabric border nodes 222 also provide border functions for internal networks and external networks. Internal borders can advertise a defined set of known subnets, such as those leading to a group of branch sites or to a data center. External borders, on the other hand, can advertise unknown destinations (e.g., to the Internet similar in operation to the function of a default route).

The fabric intermediate nodes 224 can operate as pure Layer 3 forwarders that connect the fabric border nodes 222 to the fabric edge nodes 226 and provide the Layer 3 underlay for fabric overlay traffic.

The fabric edge nodes 226 can connect endpoints to the network fabric 220 and can encapsulate/decapsulate and forward traffic from these endpoints to and from the network fabric. The fabric edge nodes 226 may operate at the perimeter of the network fabric 220 and can be the first points for attachment of users, devices, and things and the implementation of policy. In some embodiments, the network fabric 220 can also include fabric extended nodes (not shown) for attaching downstream non-fabric Layer 2 network devices to the network fabric 220 and thereby extend the network fabric. For example, extended nodes can be small switches (e.g., compact switch, industrial Ethernet switch, building automation switch, etc.) which connect to the fabric edge nodes via Layer 2. Devices or things connected to the fabric extended nodes can use the fabric edge nodes 226 for communication to outside subnets.

In this example, the network fabric can represent a single fabric site deployment which can be differentiated from a multi-site fabric deployment as discussed further below with respect to FIG. 4.

In some embodiments, all subnets hosted in a fabric site can be provisioned across every fabric edge node 226 in that fabric site. For example, if the subnet 10.10.10.0/24 is provisioned in a given fabric site, this subnet may be defined across all of the fabric edge nodes 226 in that fabric site, and endpoints located in that subnet can be placed on any fabric edge node 226 in that fabric. This can simplify IP address management and allow deployment of fewer but larger subnets. In some embodiments, one or more Cisco® Catalyst switches, Cisco Nexus® switches, Cisco Meraki® MS switches, Cisco® Integrated Services Routers (ISRs), Cisco® Aggregation Services Routers (ASRs), Cisco® Enterprise Network Compute Systems (ENCS), Cisco® Cloud Service Virtual Routers (CSRvs), Cisco Integrated Services Virtual Routers (ISRvs), Cisco Meraki® MX appliances, and/or other Cisco DNA-Ready™ devices can operate as the fabric nodes 222, 224, and 226.

The enterprise network 200 can also include wired endpoints 230A, 230C, 230D, and 230F and wireless endpoints 230B and 230E (collectively, 230). The wired endpoints 230A, 230C, 230D, and 230F can connect by wire to fabric edge nodes 226A, 226C, 226D, and 226F, respectively, and the wireless endpoints 230B and 230E can connect wirelessly to wireless access points 228B and 228E (collectively, 228), respectively, which in turn can connect by wire to fabric edge nodes 226B and 226E, respectively. In some embodiments, Cisco Aironet® access points, Cisco Meraki® MR access points, and/or other Cisco DNA™-ready access points can operate as the wireless access points 228.

The endpoints 230 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 230 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

In some embodiments, the network fabric 220 can support wired and wireless access as part of a single integrated infrastructure such that connectivity, mobility, and policy enforcement behavior are similar or the same for both wired and wireless endpoints. This can bring a unified experience for users, devices, and things that is independent of the access media.

In integrated wired and wireless deployments, control plane integration can be achieved with the WLC(s) 208 notifying the fabric control plane node(s) 210 of joins, roams, and disconnects by the wireless endpoints 230 such that the fabric control plane node(s) can have connectivity information about both wired and wireless endpoints in the network fabric 220, and can serve as the single source of truth for endpoints connected to the network fabric. For data plane integration, the WLC(s) 208 can instruct the fabric wireless access points 228 to form a VXLAN overlay tunnel to their adjacent fabric edge nodes 226. The AP VXLAN tunnel can carry segmentation and policy information to and from the fabric edge nodes 226, allowing connectivity and functionality identical or similar to that of a wired endpoint. When the wireless endpoints 230 join the network fabric 220 via the fabric wireless access points 228, the WLC(s) 208 can onboard the endpoints into the network fabric 220 and inform the fabric control plane node(s) 210 of the endpoints' Media Access Control (MAC) addresses. The WLC(s) 208 can then instruct the fabric wireless access points 228 to form VXLAN overlay tunnels to the adjacent fabric edge nodes 226. Next, the wireless endpoints 230 can obtain IP addresses for themselves via Dynamic Host Configuration Protocol (DHCP). Once that completes, the fabric edge nodes 226 can register the IP addresses of the wireless endpoint 230 to the fabric control plane node(s) 210 to form a mapping between the endpoints' MAC and IP addresses, and traffic to and from the wireless endpoints 230 can begin to flow.

Figure 3:
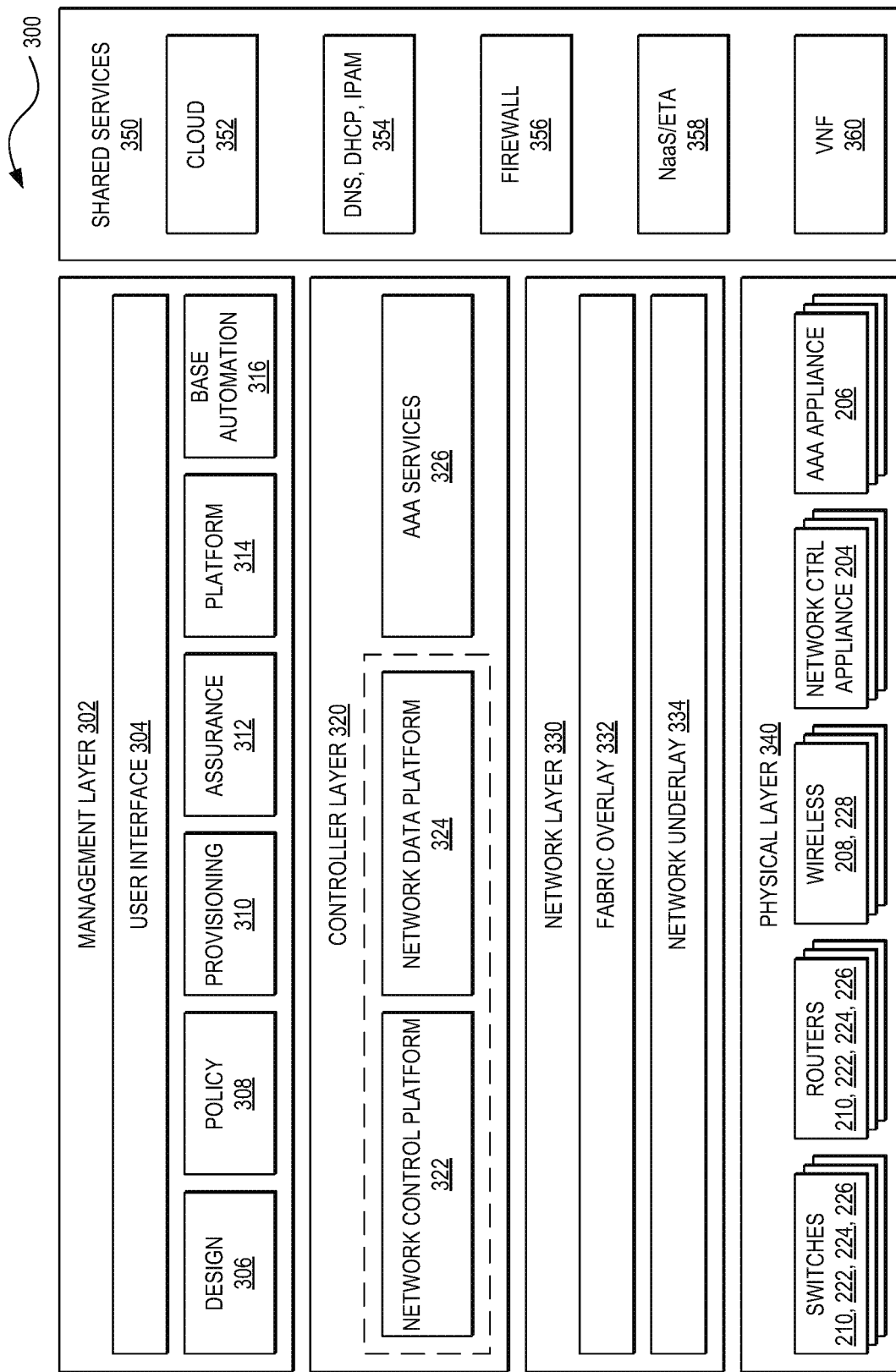
FIG. 3 illustrates an example of a logical architecture for an enterprise network in accordance with an embodiment.

FIG. 3 illustrates an example of a logical architecture 300 for an enterprise network (e.g., the enterprise network 200). One of ordinary skill in the art will understand that, for the logical architecture 300 and any system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure. In this example, the logical architecture 300 includes a management layer 302, a controller layer 320, a network layer 330 (such as embodied by the network fabric 220), a physical layer 340 (such as embodied by the various elements of FIG. 2), and a shared services layer 350.

The management layer 302 can abstract the complexities and dependencies of other layers and provide a user with tools and workflows to manage an enterprise network (e.g., the enterprise network 200). The management layer 302 can include a user interface 304, design functions 306, policy functions 308, provisioning functions 310, assurance functions 312, platform functions 314, and base automation functions 316. The user interface 304 can provide a user a single point to manage and automate the network. The user interface 304 can be implemented within a web application/web server accessible by a web browser and/or an application/application server accessible by a desktop application, a mobile app, a shell program or other command line interface (CLI), an Application Programming Interface (e.g., restful state transfer (REST), Simple Object Access Protocol (SOAP), Service Oriented Architecture (SOA), etc.), and/or other suitable interface in which the user can configure network infrastructure, devices, and things that are cloud-managed; provide user preferences; specify policies, enter data; review statistics; configure interactions or operations; and so forth. The user interface 304 may also provide visibility information, such as views of a network, network infrastructure, computing devices, and things. For example, the user interface 304 can provide a view of the status or conditions of the network, the operations taking place, services, performance, a topology or layout, protocols implemented, running processes, errors, notifications, alerts, network structure, ongoing communications, data analysis, and so forth.

The design functions 306 can include tools and workflows for managing site profiles, maps and floor plans, network settings, and IP address management, among others. The policy functions 308 can include tools and workflows for defining and managing network policies. The provisioning functions 310 can include tools and workflows for deploying the network. The assurance functions 312 can use machine learning and analytics to provide end-to-end visibility of the network by learning from the network infrastructure, end-points, and other contextual sources of information. The platform functions 314 can include tools and workflows for integrating the network management system with other technologies. The base automation functions 316 can include tools and workflows to support the policy functions 308, the provisioning functions 310, the assurance functions 312, and the platform functions 314.

In some embodiments, the design functions 306, the policy functions 308, the provisioning functions 310, the assurance functions 312, the platform functions 314, and the base automation functions 316 can be implemented as microservices in which respective software functions are implemented in multiple containers communicating with each rather than amalgamating all tools and workflows into a single software binary. Each of the design functions 306, policy functions 308, provisioning functions 310, assurance functions 312, and platform functions 314 can be viewed as a set of related automation microservices to cover the design, policy authoring, provisioning, assurance, and cross-platform integration phases of the network lifecycle. The base automation functions 314 can support the top-level functions by allowing users to perform certain network-wide tasks.

The controller layer 320 can comprise subsystems for the management layer 302 and may include a network control platform 322, a network data platform 324, and AAA services 326. These controller subsystems can form an abstraction layer to hide the complexities and dependencies of managing many network elements and protocols.

The network control platform 322 can provide automation and orchestration services for the network layer 330 and the physical layer 340, and can include the settings, protocols, and tables to automate management of the network and physical layers. For example, the network control platform 330 can provide the design functions 306 and the provisioning functions 310. In addition, the network control platform 330 can include tools and workflows for discovering switches, routers, wireless controllers, and other network infrastructure devices (e.g., a network discovery tool); maintaining network and endpoint details, configurations, and software versions (e.g., an inventory management tool); Plug-and-Play (PnP) for automating deployment of network infrastructure (e.g., a network PnP tool), Path Trace for creating visual data paths to accelerate the troubleshooting of connectivity problems, Easy QoS for automating quality of service to prioritize applications across the network, and Enterprise Service Automation (ESA) for automating deployment of physical and virtual network services, among others. The network control platform 322 can communicate with network elements using Network Configuration (NETCONF)/Yet Another Next Generation (YANG), Simple Network Management Protocol (SNMP), Secure Shell (SSH)/Telnet, and so forth. In some embodiments, the Cisco® Network Control Platform (NCP) can operate as the network control platform 322

The network data platform 324 can provide for network data collection, analytics, and assurance, and may include the settings, protocols, and tables to monitor and analyze network infrastructure and endpoints connected to the network. The network data platform 324 can collect multiple types of information from network infrastructure devices, including syslog, SNMP, NetFlow, Switched Port Analyzer (SPAN), and streaming telemetry, among others. The network data platform 324 can also collect use contextual information shared from In some embodiments, one or more Cisco DNA™ Center appliances can provide the functionalities of the management/provisioning layer 310, the network control platform 322, and the network data platform 324. The Cisco DNA™ Center appliances can support horizontal scalability by adding additional Cisco DNA™ Center nodes to an existing cluster; high availability for both hardware components and software packages; backup and store mechanisms to support disaster discovery scenarios; role-based access control mechanisms for differentiated access to users, devices, and things based on roles and scope; and programmable interfaces to enable integration with third party vendors. The Cisco DNA™ Center appliances can also be cloud-tethered to provide for the upgrade of existing functions and additions of new packages and applications without having to manually download and install them.

The AAA services 326 can provide identity and policy services for the network layer 330 and physical layer 340, and may include the settings, protocols, and tables to support endpoint identification and policy enforcement services. The AAA services 326 can provide tools and workflows to manage virtual networks and security groups, and to create group-based policies and contracts. The AAA services 326 can identify and profile network infrastructure devices and endpoints using AAA/RADIUS, 802.1X, MAC Authentication Bypass (MAB), web authentication, and EasyConnect, among others. The AAA services 326 can also collect and use contextual information from the network control platform 322, the network data platform 324, and the shared services 350, among others. In some embodiments, Cisco® ISE can provide the AAA services 326.

The network layer 330 can be conceptualized as a composition of two layers, an underlay 334 comprising physical and virtual network infrastructure (e.g., routers, switches, WLCs, etc.) and a Layer 3 routing protocol for forwarding traffic, and an overlay 332 comprising a virtual topology for logically connecting wired and wireless users, devices, and things and applying services and policies to these entities. Network elements of the underlay 334 can establish connectivity between each other, such as via Internet Protocol (IP). The underlay may use any topology and routing protocol.

In some embodiments, the network controller 204 can provide a local area network (LAN) automation service, such as implemented by Cisco DNA™ Center LAN Automation, to automatically discover, provision, and deploy network devices. Once discovered, the automated underlay provisioning service can leverage Plug and Play (PnP) to apply the required protocol and network address configurations to the physical network infrastructure. In some embodiments, the LAN automation service may implement the Intermediate System to Intermediate System (IS-IS) protocol. Some of the advantages of IS-IS include neighbor establishment without IP protocol dependencies, peering capability using loopback addresses, and agnostic treatment of IPV4, IPv6, and non-IP traffic.

The overlay 332 can be a logical, virtualized topology built on top of the physical underlay 334, and can include a fabric data plane, a fabric control plane, and a fabric policy plane. In some embodiments, the fabric data plane can be created via packet encapsulation using Virtual Extensible LAN (VXLAN) with Group Policy Option (GPO). Some of the advantages of VXLAN-GPO include its support for both Layer 2 and Layer 3 virtual topologies (overlays), and its ability to operate over any IP network with built-in network segmentation.

In some embodiments, the fabric control plane can implement Locator/ID Separation Protocol (LISP) for logically mapping and resolving users, devices, and things. LISP can simplify routing by removing the need for each router to process every possible IP destination address and route. LISP can achieve this by moving remote destination to a centralized map database that allows each router to manage only its local routs and query the map system to locate destination endpoints.

The fabric policy plane is where intent can be translated into network policy. That is, the policy plane is where the network operator can instantiate logical network policy based on services offered by the network fabric 220, such as security segmentation services, quality of service (QOS), capture/copy services, application visibility services, and so forth.

Segmentation is a method or technology used to separate specific groups of users or devices from other groups for the purpose of reducing congestion, improving security, containing network problems, controlling access, and so forth. As discussed, the fabric data plane can implement VXLAN encapsulation to provide network segmentation by using the virtual network identifier (VNI) and SGT fields in packet headers. The network fabric 220 can support both macro-segmentation and micro-segmentation. Macro-segmentation logically separates a network topology into smaller virtual networks by using a unique network identifier and separate forwarding tables. This can be instantiated as a virtual routing and forwarding (VRF) instance and referred to as a virtual network (VN). That is, a VN is a logical network instance within the network fabric 220 defined by a Layer 3 routing domain and can provide both Layer 2 and Layer 3 services (using the VXLAN VNI to provide both Layer 2 and Layer 3 segmentation). Micro-segmentation logically separates user or device groups within a VN, by enforcing source to destination access control permissions, such as by using access control lists (ACLs). A scalable group is a logical object identifier assigned to a group of users, devices, or things in the network fabric 220. It can be used as source and destination classifiers in Scalable Group ACLs (SGA-CLs). The SGT can be used to provide address-agnostic group-based policies.

In some embodiments, the fabric control plane node 210 may implement the Locator/Identifier Separation Protocol (LISP) to communicate with one another and with the management cloud 202. Thus, the control plane nodes may operate a host tracking database, a map server, and a map resolver. The host tracking database can track the endpoints 230 connected to the network fabric 220 and associate the endpoints to the fabric edge nodes 226, thereby decoupling an endpoint's identifier (e.g., IP or MAC address) from its location (e.g., closest router) in the network.

The physical layer 340 can comprise network infrastructure devices, such as switches and routers 210, 222, 224, and 226 and wireless elements 208 and 228 and network appliances, such as the network controller appliance(s) 204, and the AAA appliance(s) 206.

The shared services layer 350 can provide an interface to external network services, such as cloud services 352; Domain Name System (DNS), DHCP, IP Address Management (IPAM), and other network address management services 354; firewall services 356; Network as a Sensor (Naas)/Encrypted Threat Analytics (ETA) services; and Virtual Network Functions (VNFs) 360; among others. The management layer 302 and/or the controller layer 320 can share identity, policy, forwarding information, and so forth via the shared services layer 350 using APIs.

Figure 4:
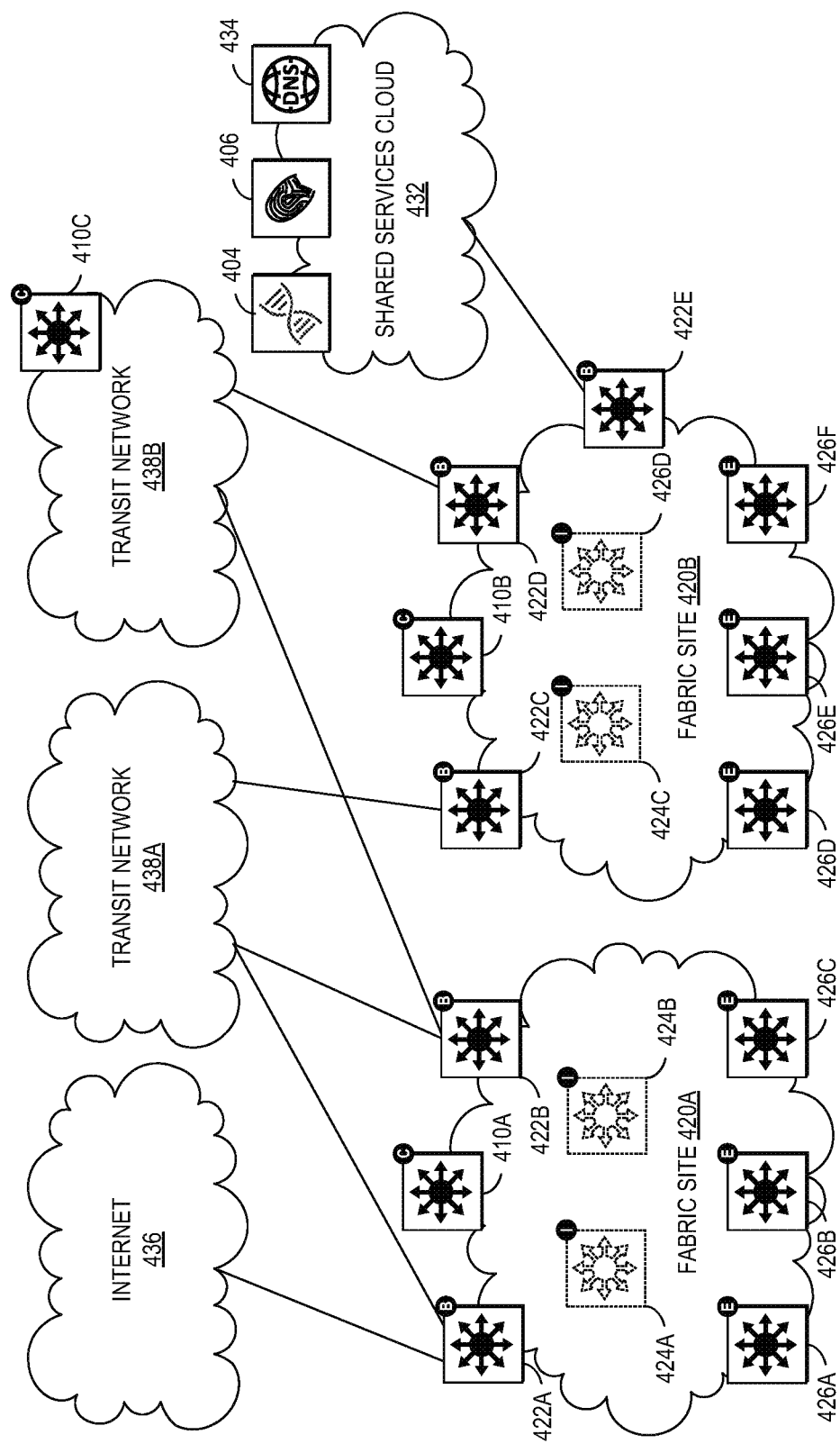
FIG. 4 illustrates an example of a physical topology of an enterprise network in accordance with an embodiment.

FIG. 4 illustrates an example of a physical topology for a multi-site enterprise network 400. In this example, the network fabric comprises fabric sites 420A and 420B. The fabric site 420A can include a fabric control node 410A, fabric border nodes 422A and 422B, fabric intermediate nodes 424A and 424B (shown here in dashed line and not connected to the fabric border nodes or the fabric edge nodes for simplicity), and fabric edge nodes 426A-D. The fabric site 420B can include a fabric control node 410B, fabric border nodes 422C-E, fabric intermediate nodes 424C and 424D, and fabric edge nodes 426D-F. Multiple fabric sites corresponding to a single fabric, such as the network fabric of FIG. 4, can be interconnected by a transit network. A transit network can be a portion of a network fabric that has its own control plane nodes and border nodes but does not have edge nodes. In addition, a transit network shares at least one border node with each fabric site that it interconnects.

In general, a transit network connects a network fabric to the external world. There are several approaches to external connectivity, such as a traditional IP network 436, traditional WAN 438A, Software-Defined WAN (SD-WAN) (not shown), or Software-Defined Access (SD-Access) 438B. Traffic across fabric sites, and to other types of sites, can use the control plane and data plane of the transit network to provide connectivity between these sites. A local border node can operate as the handoff point from the fabric site, and the transit network can deliver traffic to other sites. The transit network may use additional features. For example, if the transit network is a WAN, then features like performance routing may also be used. To provide end-to-end policy and segmentation, the transit network should be cable of carrying endpoint context information (e.g., VRF, SGT) across the network. Otherwise, a re-classification of the traffic may be needed at the destination site border.

The local control plane in a fabric site may only hold state relevant to endpoints that are connected to edge nodes within the local fabric site. The local control plane can register local endpoints via local edge nodes, as with a single fabric site (e.g., the network fabric 120). An endpoint that isn't explicitly registered with the local control plane may be assumed to be reachable via border nodes connected to the transit network. In some embodiments, the local control plane may not hold state for endpoints attached to other fabric sites such that the border nodes do not register information from the transit network. In this manner, the local control plane can be independent of other fabric sites, thus enhancing overall scalability of the network.

The control plane in the transit network can hold summary state for all fabric sites that it interconnects. This information can be registered to the transit control plane by border from different fabric sites. The border nodes can register EID information from the local fabric site into the transit network control plane for summary EIDs only and thus further improve scalability.

The multi-site enterprise network 400 can also include a shared services cloud 432. The shared services cloud 432 can comprise one or more network controller appliances 404, one or more AAA appliances 406, and other shared servers (e.g., DNS; DHCP; IPAM; SNMP and other monitoring tools; NetFlow, syslog, and other data collectors, etc.) may reside. These shared services can generally reside outside of the network fabric and in a global routing table (GRT) of an existing network. In this case, some method of inter-VRF routing may be required. One option for inter-VRF routing is to use a fusion router, which can be an external router that performs inter-VRF leaking (e.g., import/export of VRF routes) to fuse the VRFs together. Multi-Protocol can be used for this route exchange since it can inherently prevent routing loops (e.g., using the AS_PATH attribute). Other routing protocols can also be used but may require complex distribute-lists and prefix-lists to prevent loops.

However, there can be several disadvantages in using a fusion router to achieve inter-VN communication, such as route duplication because routes leaked from one VRF to another are programmed in hardware tables and can result in more TCAM utilization, manual configuration at multiple touch points wherever route-leaking is implemented, loss of SGT context because SGTs may not be maintained across VRFs and must be re-classified once the traffic enters the other VRF, and traffic hairpinning because traffic may need to be routed to the fusion router, and then back to the fabric border node.

SD-Access Extranet can provide a flexible and scalable method for achieving inter-VN communications by avoiding route duplication because inter-VN lookup occurs in the fabric control plane (e.g., software) such that route entries do not need to be duplicated in hardware; providing a single touchpoint because the network management system (e.g., Cisco DNA™ Center) can automate the inter-VN lookup policy, making it a single point of management; maintaining SGT context because the inter-VN lookup occurs in the control plane node(s) (e.g., software), and avoids hairpinning because inter-VN forwarding can occur at the fabric edge (e.g., the same intra-VN) so traffic does not need to hairpin at the border node. Another advantage is that a separate VN can be made for each of the common resources that are needed (e.g., a Shared Services VN, an Internet VN, a data center VN, etc.).

As discussed previously, networking environments can be monitored to ensure that they are performing in a correct manner, e.g. to provide network assurance. Typically, network devices can be monitored on a per-network device basis. In turn, bottlenecks in the networking environment may be isolated to a specific network device. Individual network devices can be multi-faceted, encompassing multiple pieces of hardware and software. Accordingly, problems often occur on a sub-network device level, making it difficult to accurately detect both the occurrence and sources of the problems in a network environment, e.g. without extensive testing. In turn, this makes it difficult to mitigate the problems in the network environment.

In particular, SDN controllers can troubleshoot network and client issues at a functional level with respect to the client, e.g. was the client able to on-board and if not, where did the onboarding fail. As follows, SDN controllers can provide statistics related to various communications happening in the system e.g. authentication, failures seen, latencies observed in communications, at the functional level with respect to the client. However, SDN controllers can fail in correlating these statistics to represent the health of the network environment from a functional perspective beyond the client level. For example, SDN controllers can fail to discovery and conceptualize how or whether the observed latencies impacted a functional flow at a level below the client level.

There therefore exist needs for systems, methods, and computer-readable media for monitoring a network environment on a sub-component basis. Further, there exist needs for systems, methods, and computer-readable media for generating and presenting analytics in a network environment on a sub-component basis with respect to network devices in the network environment.

The present includes systems, methods, and computer-readable media for solving these problems/discrepancies. Specifically, the present technology involves systems, methods, and computer-readable media for monitoring a network environment on a sub-component basis with respect to network device in the network environment. Further, the present technology involves systems, methods, and computer-readable media for generating and presenting analytics for a network environment on a sub-component basis with respect to network devices in the network environment.

FIG. 5 illustrates an example network environment for monitoring network devices on a sub-component basis.

In the network environment shown in FIG. 5, user 500, otherwise an applicable originating node, can send a service request to service 590 in order to access network services through the network environment. User 500, for example, can be an employee attempting to access a company intranet, a consumer attempting to access an ecommerce site, or a student attempting to access a university resource. While the end node is described as a service 590, the end node can be an applicable end node that receives and/or generates traffic in a network environment. For example, the end node can be another user associated with the network environment. Traffic passes between the user 500 and the service 590 through networking devices 510 and 520. While the traffic is shown as passing from the user 500 to the service 590, the techniques described herein can be applied to traffic passing from the service 590 the user 500.

Networking devices 510 and 520 can be an applicable device in a network environment through which traffic flows as part of providing access to network services. For example, network devices 510 and 520 can include routers, edges, borders, or modules of a software-defined network, among other possibilities. Further, while the traffic is shown as passing through two networking devices, the traffic can actually pass through fewer or more networking devices.

Networking devices 510 and 520 are comprised of sub-components. Sub-components of a networking device, as used herein, can include applicable portions of a networking device, e.g. portions of a networking device that relate to the functioning of the networking device in a network environment. Specifically, sub-components of a networking device can include hardware components of the networking device, software components of the networking device, and combined hardware and software components of the networking device. For example, a sub-component of a router can include one or more ports of the router.

In the example network environment shown in FIG. 5, various sub-components of the networking device 510 are shown. The sub-components shown in FIG. 5 are merely examples of sub-components of a networking device and a networking device in the network environment can include different sub-components, e.g. based on the type of networking device. The networking device 510 includes receiver/transmitter module 530. The receiver/transmitter module 530 can receive traffic, such as that from user 500, and forward traffic, such as the authenticated traffic transmitted to networking device 520. Receiver/transmitter module 530 can authenticate traffic, e.g. via authentication processes 540, which can authenticate facets of the service request, including user identity, device context, behavioral context, or other factors. Data from the traffic can be sent to traffic database 560, which can interact with an external database to send and receive traffic data. Traffic data including that of the current functional flow can be sent to data flow anomaly detector 550, which can use anomaly detection methods to detect anomalies in the traffic which may pose security threats.

Each sub-component of networking device 510, e.g. receiver/transmitter 530, authentication process 540, data flow anomaly detector 550, and traffic database 560, can be a hardware sub-component, a software sub-component, or a combination hardware-software sub-component. Networking device 520 can also comprises sub-components, though these are not shown in FIG. 5.

One or more functional flows across the sub-components of the networking devices 510 and 520, e.g. sub-components 530, 540, 550 and 560, can be monitored to generate functional flow data. Functional flows can include applicable flows of data occurring during operation of a network environment. For example, functional flows can include flows of data related to wireless client onboarding, DHCP IP address acquisition, DNS requests, L3 or ICMP-based instrumentation, or latency, error, or path probing, among other possibilities. Functional flow data can include applicable data included as part of or capable of being derived from functional flows in a network environment. For example, functional flow data can include call counts, errors, and latencies associated with functional flows.

The sub-components of the networking devices 510 and 520 can be disaggregated from the corresponding networking devices 510 and 520 that include or are otherwise associated with the sub-components. For example, the authentication process 540 can be disaggregated or otherwise separated conceptually from the networking device 510. In turn, the sub-components can be monitored separately from the corresponding networking devices 510 and 520 that include or are otherwise associated with the sub-components. As a result, functional flows passing through or otherwise associated with each of the sub-components can be monitored separately on a sub-component basis. Specifically, functional flows passing through or otherwise associated with a sub-component can be monitored separately from other sub-components and one or more corresponding networking devices that include or otherwise or associated with the sub-component. In turn, functional flow data can be generated on a sun-component basis for one or more sub-components in the network environment.

By disaggregating sub-components of a networking device and generating functional flow data on a sub-component basis, separate functional flow data related to internal operation of the networking device and external operation of the networking device can be generated. Functional flow data related to internal communications within the networking device that occur during operation of the networking device can be generated, and functional flow data related to external communications flowing into and out of the networking device during operation of the networking device can be generated. For example, service call traffic occurring within the networking device can be effectively separated from external communications, e.g. radius requests, flowing into and out of the networking device during operation of the networking device. Further, functional flow data related to communications between sub-components and external entities can be generated as well. Collectively, the functional flow data can provide an integrated view of a network that unifies internal and external communications into a single web of functional flows.

Analytics engine 570 generates sub-component-level analytics for functional flows passing through networking devices 510 and 520. Specifically, the analytics engine 570 can generate analytics from the functional flow data identified for the sub-components on a sub-component basis. Analytics generating from the functional flow data can include applicable data and statistics associated with functional flows in a network environment. For example, analytics generated from the flow functional data can include which entities communicate with each other, the nature of these communications, or communications with external software libraries, among other possibilities. The analytics engine 570 can be implemented in an applicable location for generating analytics for a network environment on a sub-component basis with respect to networking devices in the network environment. For example, the analytics engine 570 can be implemented, at least in part, in a cloud or fog environment, such as the environments shown in FIGS. 5A and 5B. Further, the analytics engine 570 can be implemented in the management cloud 202.

In generating analytics on a sub-component basis, the analytics engine 570 can generate analytics describing the operation of networking devices from both an internal communication perspective and an external communication perspective. Internally, the analytics can measure communications between sub-components of a networking device, including, for example, data related to call counts, latencies, and errors. Externally, the analytics can measure communications between networking devices, including, for example, data related to wireless client onboarding, service call requests, or DNS requests. In turn, the analytics generated from internal communications at a networking device, otherwise referred to as internal analytics, and analytics generated from external communications at the networking device, otherwise referred to as external analytics, can be correlated.

Currently, it is difficult to determine if an issue is happening because of an internal system limitation (e.g. there is too much DB lock contention) or an uneven distribution of load (one process is managing too many APs and thereby clients). The present technology can facilitate correlation of an issue to internal system limitations, e.g. taking networking device-level insights on a the sub-component level. A functional flow monitored between mapped communications (internal/external) can be visualized live, with the ability to drill down to the internals of a specific issue. For example, it is possible to gather backend (e.g. AAA/DHCP etc) latencies and statistics. Further in the example, there might be a 200 ms latency in a Radius call and a 200 ms latency in an internal DB access protocol. However, dividing one of the two latencies by two is not going to aid in gaining any network insight, if both requests are anyway happening at the same time. Instead, the latencies can be directly correlated with a feature (functional flow) to assess an actual impact of the latencies in the network environment.

A first aspect of correlated internal/external analytics can include predicting feature health through functional flow monitoring, e.g. continuous functional flow monitoring. In turn, these analytics can facilitate feature monitoring to determine a health of the feature based on available statistics (latency, response-time, load, tc . . . ). Specifically, "software internal/external architecture" baselines can be established and monitored. More specifically, by monitoring at a sub-component level, the generated analytics can be used in predicting any increase in functional latency before it the latency is perceivable, e.g. through network monitoring, in a network environment. These future health predictions can be generated by supervised learning algorithms, regression models, or other applicable techniques.

Analytics can be tied to network changes, including a change in network topology, a new feature, or a replacement networking device. Related functional flow latencies can be monitored under the present technology, and deviations can be directly linked to the network change. These analytics can then be presented in a manner that allows networking administrators to make actionable decisions in a quick and efficient manner.

Another aspect of generated analytics can include auto-scaling of managed virtual instances based on functional flow health. These analytics provide a way to monitor critical flows in a system. Specifically, where statistics derived from these flows can be used in determining whether a system or device in a network environment is overloaded. In turn, network administrators can establish protocols to spawn new instances in the network environment to manage the load in the network environment in an automated manner based on the generated analytics.

The present technology can improve an applicable SDN environment, e.g. the Cisco DNA™ Center, by providing a high-level view of the wireless controller through key internal specific metrics (internal analytics), monitoring the system for errors or unexpected latencies or rates (internal and external analytics), raising alarms in response to unexpected changes, allowing automated protocols to trigger (internal and external analytics), providing instant deployment/architectural full root cause analysis on such issues (internal and external analytics), and correlating latency spikes between internal sub-components and external communications (internal and external analytics).

With reference to the example environment shown in FIG. 5, generated analytics can be passed to graphical user interface (GUI) 580 for consumption by a network administrator. Based on the analytics provided, the network administrator can respond to network inefficiencies appropriately. Analytics engine 570 can correlate network traffic with service call traffic to create functionally correlated traffic flows, and can generate analytics for these functionally correlated traffic flows.

The GUI 580 can display the correlated analytics across internal and external communications. Specifically, the GUI 580 can display the correlated analytics in a manner that functionally links the internal and external communications at a networking device. More specifically, the GUI 580 can display the correlated analytics in manner that functionally links the internal and external communications across a plurality of networking devices. Effectively, the overall functional latency across the network devices 510 and 520 can be presented to an administrator across networking devices in the network environment.

FIG. 6 illustrates an example graphical user interface (GUI) of analytics in a network environment that are generated on a sub-component basis. A user interface displays analytics generated by analytics engine 570 for use by a network administrator. The analytics can come in the form of directed graphs, network statistics through time, or network statistics by category.

GUI 580 can display analytics received from analytics engine 570. In some embodiments, a network administrator may choose what analytics are displayed and how they are displayed.

Directed graph analytics 610 illustrate a directed graph of the network environment monitored by the present technology. Network devices 510 and 520 as well as sub-components 530, 540, 550, and 560 can be represented as nodes in the graph. Communications between notes are represented by arrows which show the direction of the communication. These graph vertices can also show communication properties, such as latencies, rates, or errors, among other possibilities.

The directed graph displayed in directed graph analytics 610 can show network devices and their one or more sub-components. Vertices in the graph can move from a network device to a sub-component, a network device to a device, a sub-component to a network device, or a sub-component to a sub-component. The directed graph can show functional linkages between the networking environment and users and services that the networking environment communicates with.

Temporal analytics 620 shows analytics through time in the network environment. For example, it can display error rate through time, traffic volume through time, or average latency through time for specific devices or sub-components, or for the networking environment as a whole. Any analytics that show changes through time can be displayed here.

Categorical analytics 630 shows categorical analytics from the network environment. For example, it can plot the proportion of service requests that were delivered to employees, contractors, or third parties. These analytics can be displayed as bar graphs, pie charts, tables, or by other means. Any analytics that show categories of data can be displayed here.

Network administrators can use these analytics to predict future network health based on the continuous flow monitoring, troubleshoot functional flows, determine consequences of feature enablement, or auto-scale managed virtual instances based on functional flow health. What analytics are generated in analytics engine 570 can be determined by a network administrator or by a third party with domain expertise in network analytics.

FIG. 7 illustrates an example method in accordance with some embodiments of the present technology, and can be carried out by the system described in FIGS. 5 and 6. However, nothing in FIG. 7 should be considered limiting of the system illustrated in FIG. 5 or FIG. 6, and likewise, the system illustrated in FIG. 5 or FIG. 6 should not be interpreted to limit the method of FIG. 7. Any limitation of the depicted system or method will be recited in the appended claims.

The method begins when the monitoring system identifies (700) one or more network devices 510 or 520 in a networking environment, and further identifies (710) one or more sub-components 530, 540, 550, or 560 within at least one of the identified network devices 510 or 520. This identification can use the framework of an existing network monitoring solution, such as AppDynamics®.

The identified sub-components 530, 540, 550, or 560 are disaggregated (720) from their corresponding network device 510. This allows the network monitoring system to treat sub-components as network devices, and apply analytics normally reserved for network devices to sub-components of those network devices.

Once identified, the sub-components 530, 540, 550, or 560 and network devices 510 or 520 are monitored (730) as they receive and handle functional flows across the networking environment. These flows can encompass service requests, internal communications, calls to external software libraries, or other traffic the networking environment can handle.

From the monitored functional flows, analytics engine 570 can generate (740) analytics of the networking environment at the sub-component level. Sub-components 530, 540, 550, or 560 are treated as separate entities by analytics engine 570, allowing for a more granular view of functional flows and how they proceed not only between network devices 510 and 520 but within a network device 510.

Analytics engine 570 sends these analytics to GUI 580, which then displays (750) the analytics. Analytics can be shown in the form of directed graphs 610, temporal analytics 620, or categorical analytics 630.

The disclosure now turns to FIGS. 8 and 9, which illustrate example network devices and computing devices, such as switches, routers, load balancers, client devices, and so forth.

FIG. 8 illustrates an example of a network device 800 (e.g., switch, router, network appliance, etc.). The network device 800 can include a master central processing unit (CPU) 802, interfaces 804, and a bus 806 (e.g., a PCI bus). When acting under the control of appropriate software or firmware, the CPU 802 can be responsible for executing packet management, error detection, and/or routing functions. The CPU 802 preferably accomplishes all these functions under the control of software including an operating system and any appropriate applications software. The CPU 802 may include one or more processors 808 such as a processor from the Motorola family of microprocessors or the MIPS family of microprocessors. In an alternative embodiment, the processor 808 can be specially designed hardware for controlling the operations of the network device 800. In an embodiment, a memory 810 (such as non-volatile RAM and/or ROM) can also form part of the CPU 802. However, there are many different ways in which memory could be coupled to the system.

The interfaces 804 can be provided as interface cards (sometimes referred to as line cards). The interfaces 804 can control the sending and receiving of data packets over the network and sometimes support other peripherals used with the network device 800. Among the interfaces that may be provided are Ethernet interfaces, frame relay interfaces, cable interfaces, DSL interfaces, token ring interfaces, and the like. In addition, various very high-speed interfaces may be provided such as a fast token ring interface, wireless interface, Ethernet interface, Gigabit Ethernet interface, Asynchronous Transfer Mode (ATM) interface, High-Speed Serial Interface (HSSI), Packet Over SONET (POS) interface, Fiber Distributed Data Interface (FDDI), and the like. The interfaces 604 may include ports appropriate for communication with the appropriate media. In some cases, the interfaces 804 may also include an independent processor and, in some instances, volatile RAM. The independent processors may control communication intensive tasks such as packet switching, media control, and management. By providing separate processors for the communication intensive tasks, the interfaces 804 may allow the CPU 802 to efficiently perform routing computations, network diagnostics, security functions, and so forth.

Although the system shown in FIG. 8 is an example of a network device of an embodiment, it is by no means the only network device architecture on which the subject technology can be implemented. For example, an architecture having a single processor that can handle communications as well as routing computations and other network functions, can also be used. Further, other types of interfaces and media may also be used with the network device 800.

Regardless of the network device's configuration, it may employ one or more memories or memory modules (including the memory 810) configured to store program instructions for general-purpose network operations and mechanisms for roaming, route optimization, and routing functions described herein. The program instructions may control the operation of an operating system and/or one or more applications. The memory or memories may also be configured to store tables such as mobility binding, registration, and association tables.

FIG. 9 illustrates an example of a bus computing system 900 wherein the components of the system are in electrical communication with each other using a bus 905. The computing system 900 can include a processing unit (CPU or processor) 910 and a system bus 905 that may couple various system components including the system memory 915, such as read only memory (ROM) 920 and random access memory (RAM) 925, to the processor 910. The computing system 900 can include a cache 912 of high-speed memory connected directly with, in close proximity to, or integrated as part of the processor 910. The computing system 900 can copy data from the memory 915, ROM 920, RAM 925, and/or storage device 930 to the cache 912 for quick access by the processor 910. In this way, the cache 912 can provide a performance boost that avoids processor delays while waiting for data. These and other modules can control the processor 910 to perform various actions. Other system memory 915 may be available for use as well. The memory 915 can include multiple different types of memory with different performance characteristics. The processor 910 can include any general purpose processor and a hardware module or software module, such as module 1 932, module 2 934, and module 3 936 stored in the storage device 930, configured to control the processor 910 as well as a special-purpose processor where software instructions are incorporated into the actual processor design. The processor 910 may essentially be a completely self-contained computing system, containing multiple cores or processors, a bus, memory controller, cache, etc. A multi-core processor may be symmetric or asymmetric.

To enable user interaction with the computing system 900, an input device 945 can represent any number of input mechanisms, such as a microphone for speech, a touch-protected screen for gesture or graphical input, keyboard, mouse, motion input, speech and so forth. An output device 935 can also be one or more of a number of output mechanisms known to those of skill in the art. In some instances, multimodal systems can enable a user to provide multiple types of input to communicate with the computing system 900. The communications interface 940 can govern and manage the user input and system output. There may be no restriction on operating on any particular hardware arrangement and therefore the basic features here may easily be substituted for improved hardware or firmware arrangements as they are developed.

The storage device 930 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 930 can include the software modules 932, 934, 936 for controlling the processor 910. Other hardware or software modules are contemplated. The storage device 930 can be connected to the system bus 905. In some embodiments, a hardware module that performs a particular function can include a software component stored in a computer-readable medium in connection with the necessary hardware components, such as the processor 910, bus 905, output device 935, and so forth, to carry out the function. For clarity of explanation, in some instances the present technology may be presented as including individual functional blocks including functional blocks comprising devices, device components, steps or routines in a method embodied in software, or combinations of hardware and software.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, media, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method comprising:
identifying sub-components of one or more network devices, wherein the one or more network devices are in a network environment;
disaggregating the sub-components from corresponding network devices of the one or more network devices, wherein the sub-components include portions of the corresponding network devices that relate to functioning of the corresponding network devices in the network environment;
monitoring one or more functional flows across the sub-components on a sub-component basis to generate functional flow data associated with the sub-components, wherein the one or more functional flows include both network traffic traversing the network environment and service call traffic related to operation of the sub-components within the corresponding network devices of the one or more network devices including the sub-components;
correlating the network traffic and the service call traffic to generate functionally correlated traffic data included as part of the functional flow data; and
generating, from the functional flow data, analytics of the network environment on a sub-component basis that describe operation of the one or more network devices from both an internal communication perspective between integrated subcomponents of a network device of the one or more network devices and an external communication perspective between subcomponents of two different network devices when the one or more network devices include a plurality of network devices.

2. The method of claim 1, wherein the sub-components include either or both hardware components and software components of the one or more network devices.

3. The method of claim 1, further comprising generating a graphical user interface (GUI) displaying at least a portion of the analytics of the network environment on the sub-component basis.

4. The method of claim 3, wherein generating the GUI further comprises:
mapping a directed graph of the network environment, wherein the one or more network devices and the sub-components redefined as network components are treated as nodes and the functional flows are treated as edges;
creating a set of plots that show changes in the functional flow data through time;
creating a set of plots that show categories of functional flow data during a time period; and
including the directed graph and the sets of plots in the GUI.

5. The method of claim 1, further comprising:
generating a graphical user interface (GUI) displaying at least a portion of the analytics generated from the functionally correlated traffic data, wherein the graphical user interface includes a representation of the network traffic and the service call traffic functionally linked across at least a portion of the sub-components.

6. The method of claim 1, wherein the one or more functional flows are associated with one or a combination of wireless client onboarding in the network environment, address acquisition in the network environment, domain name system (DNS) requests in the network environment, latency probing in the network environment, path probing in the network environment, and error probing in the network environment.

7. The method of claim 1, wherein the functional flow data includes one or a combination of path information, time information, and latency information associated with the network environment.

8. The method of claim 1, wherein the analytics includes one or more models of one or a combination of sub-component communications in the network environment, errors associated with the sub-component communications in the network environment, outgoing and incoming communication to a software library associated with the network environment, and external communications to the network environment.

9. The method of claim 1, wherein the analytics include predictive health of a functional flow of the one or more functional flows in the network environment.

10. The method of claim 1, wherein the analytics include a correlation of an identified issue in the network environment to a functional flow of the one or more functional flows in the network environment.

11. The method of claim 1, wherein the one or more network devices include one or more virtualized network devices in the network environment, the method further comprising managing virtualized devices including the one or more virtualized network devices in the network environment based on the analytics of the network environment.

12. A system comprising:
one or more processors; and
at least one computer-readable storage medium having stored therein instructions which, when executed by the one or more processors, cause the one or more processors to perform operations comprising:
identifying sub-components of one or more network devices in a network environment, wherein the sub-components include either or both hardware components and software components of the one or more network devices;
disaggregating the sub-components from corresponding network devices of the one or more network devices, wherein the sub-components include portions of the corresponding network devices that relate to functioning of the corresponding network devices in the network environment;
monitoring one or more functional flows across the sub-components on a sub-component basis to generate functional flow data associated with the sub-components, wherein the one or more functional flows include both network traffic traversing the network environment and service call traffic related to operation of the sub-components within the corresponding network devices of the one or more network devices including the sub-components;
correlating the network traffic and the service call traffic to generate functionally correlated traffic data included as part of the functional flow data; and
generating, from the functional flow data, analytics of the network environment on a sub-component basis that describe operation of the one or more network devices from both an internal communication perspective between integrated subcomponents of a network device of the one or more network devices and an external communication perspective between subcomponents of two different network devices when the one or more network devices include a plurality of network devices.

13. The system of claim 12, wherein the instructions which, when executed by the one or more processors, further cause the one or more processors to perform operations comprising generating a graphical user interface (GUI)

displaying at least a portion of the analytics of the network environment on the sub-component basis.

14. The system of claim 12, wherein the analytics include a correlation of an identified issue in the network environment to a functional flow of the one or more functional flows in the network environment.

15. The system of claim 12, wherein the functional flow data includes one or a combination of path information, time information, and latency information associated with the network environment.

16. The system of claim 12, wherein the sub-components include both hardware components and software components of the one or more network devices.

17. The system of claim 13, wherein generating the GUI further comprises:
mapping a directed graph of the network environment, wherein the one or more network devices and the sub-components redefined as network components are treated as nodes and the functional flows are treated as edges;
creating a set of plots that show changes in the functional flow data through time;
creating a set of plots that show categories of functional flow data during a time period; and
including the directed graph and the sets of plots in the GUI.

18. The system of claim 12, wherein the analytics include predictive health of a functional flow of the one or more functional flows in the network environment.

19. The system of claim 12, generating a graphical user interface (GUI) displaying at least a portion of the analytics generated from the functionally correlated traffic data, wherein the graphical user interface includes a representation of the network traffic and the service call traffic functionally linked across at least a portion of the sub-components.

20. A non-transitory computer-readable storage medium having stored therein instructions which, when executed by a processor, cause the processor to perform operations comprising:
identifying sub-components of one or more network devices, wherein the one or more network devices are in a network environment;
disaggregating the sub-components from corresponding network devices of the one or more network devices, wherein the sub-components include portions of the corresponding network devices that relate to functioning of the corresponding network devices in the network environment;
monitoring one or more functional flows across the sub-components on a sub-component basis to generate functional flow data associated with the sub-components, wherein the one or more functional flows include both network traffic traversing the network environment and service call traffic related to operation of the sub-components within the corresponding network devices of the one or more network devices including the sub-components;
correlating the network traffic and the service call traffic to generate functionally correlated traffic data included as part of the functional flow data;
generating, from the functional flow data, analytics of the network environment on a sub-component basis that describe operation of the one or more network devices from both an internal communication perspective between integrated subcomponents of a network device of the one or more network devices and an external communication perspective between subcomponents of two different network devices when the one or more network devices include a plurality of network devices; and
generating a graphical user interface (GUI) displaying at least a portion of the analytics of the network environment on the sub-component basis.

* * * * *